United States Patent [19]

Schweizer

[11] Patent Number: 4,493,718
[45] Date of Patent: Jan. 15, 1985

[54] PAINT SPRAY FILTER SYSTEM

[75] Inventor: Randy Schweizer, Park Ridge, Ill.

[73] Assignee: Chemco Manufacturing Co., Inc., Skokie, Ill.

[21] Appl. No.: 480,783

[22] Filed: Mar. 31, 1983

[51] Int. Cl.³ .............................................. B01D 39/04
[52] U.S. Cl. .......................................... 55/491; 55/492; 55/494; 55/495; 55/504; 55/527; 55/DIG. 46
[58] Field of Search ................. 55/491, 492, 494, 495, 55/497, 499, 504, 527, DIG. 46; 98/115 SB

[56] References Cited

U.S. PATENT DOCUMENTS

| 2,850,269 | 9/1958 | Bohanon | 55/491 |
| 3,218,784 | 11/1965 | Greiner | 55/491 |
| 3,280,984 | 10/1966 | Sexton et al. | 55/491 |
| 4,321,064 | 3/1982 | Vargo | 55/446 X |

FOREIGN PATENT DOCUMENTS

| 2020056 | 11/1971 | Fed. Rep. of Germany | 55/497 |
| 1228872 | 4/1971 | United Kingdom | 55/504 |

Primary Examiner—Charles Hart
Attorney, Agent, or Firm—Willian, Brinks, Olds, Hofer, Gilson & Lione Ltd.

[57] ABSTRACT

A paint spray filter for use in a paint spray booth. The filter comprises a grid having a plurality of vertical and horizontal members, attachment means secured to the grid extending upwardly and outwardly therefrom, and a sheet of fiberglass filter material. The fiberglass filter material has a first face substantially covering the grid and being secured thereto by the attachment means, and a fully exposed second face. Support means extending from the edges of the grid are adapted to cooperate with the frame members of the paint spray booth for maintaining the paint spray filter in the booth.

2 Claims, 4 Drawing Figures

PAINT SPRAY FILTER SYSTEM

BACKGROUND OF THE INVENTION

This invention relates to paint spray booths generally, and specifically to filters used in such booths. The prior art teaches a wide variety of paint spray booths including those disclosed in U.S. Pat. Nos. 4,231,289; 3,932,151; 3,811,371; 3,252,401; 3,216,183; and 2,875,680. Similarly, the prior art shows a wide variety of filters used in paint spray booths or other filtering applications. Some of these include filters disclosed in U.S. Pat. Nos. 3,320,927; 3,289,984; 3,132,015; 2,846,022; and 2,408,158.

One well known paint spray booth is manufactured by Binks Manufacturing Company of Franklin Park, Ill. and is described in Binks Bulletin A29-4R-2. This booth comprises, in general, a pair of substantially parallel side panels, an end panel interconnecting the side panels, a top panel overlying the side panels and the end panel, means defining access to the booth from the front, and frame members supporting a paint spray filter disposed intermediate the end panel and the access. The paint spray filter sometimes used in these Binks paint spray booths are of the type known as Andreae filters, and are generally described in U.S. Pat. Nos. 4,008,060 and/or 3,075,337. Though the paint spray booths of the type described, with so-called Andreae filters installed therein, function reasonably well, they are not without certain drawbacks. For example, a user sometimes experiences heavy paint loading at the point of direct application of spray paint with insufficient spreading or difussing of the paint to other areas of the filter. As a result, the filters of the prior art sometimes become clogged with paint and must be replaced. Moreover, paint sometimes passes through the filter to the exhaust area of the spray booth located behind the filter, thereby permitting toxic fumes and particulate matter to be exhausted into the ambient air.

Accordingly, it is a primary object of this invention to provide an improved paint spray filter for use in Binks-type paint spray booths. It is another object of this invention to provide such an improved filter which is of relatively simple and inexpensive construction, yet provides a desirable spreading effect of paint throughout substantial areas of the filter, and which further minimizes the amount of the paint which passes through the filter into the exhaust area of the spray booth. It is a further object of this invention to provide an expeditious method for connecting a Binks-type paint spray booth with a filter of the type described to provide improved results at a lower cost.

SUMMARY OF THE INVENTION

The foregoing objects are achieved by a paint spray filter for use in a paint spray booth characterized by a pair of substantially parallel side panels, an end panel interconnecting the side panels, a top panel overlying the side panels and the end panel, means defining access to the booth from the front, and frame members disposed intermediate the end panel and the access. The filter includes a grid comprising a plurality of parallel vertical members including a first pair defining the vertical edges of the grid, and a second pair located inside the edges defined by the first pair. The grid further includes a plurality of parallel horizontal members including a first pair defining the horizontal edges of the grid and a second pair located inside the edges defined by the first pair. Attachment spikes extend outwardly and upwardly from the grid and a sheet of fiberglass material, having a first face substantially covering the grid and a fully exposed second face, is secured to the grid by the attachment spikes. Finally, support means, extending from the edges of the grid and adapted to cooperate with the frame members of the paint spray booth for maintaining the paint spray filter in the booth are provided, whereby the paint spray filter defines a barrier separating the booth into an exhaust area located between the barrier and the end panel, and a spraying area located between the barrier and the access.

In another aspect of this invention a method for converting a paint spray booth characterized by a pair of substantially parallel side panels, and end panel interconnecting the side panels, a top panel overlying the side panels and the end panel, means defining access to the booth from the front, frame members disposed intermediate the end panel and the access, and a filter secured to the frame members is provided. The method includes the steps of removing the filter from the frame members, providing a substitute filter of the type described above, and securing the substitute filter to the frame members.

BRIEF DESCRIPTION OF THE DRAWINGS

An exemplary embodiment of the invention summarized above is shown in the following drawings wherein.

DETAILED DESCRIPTION OF AN EXEMPLARY EMBODIMENT OF THE INVENTION

Figure 1:
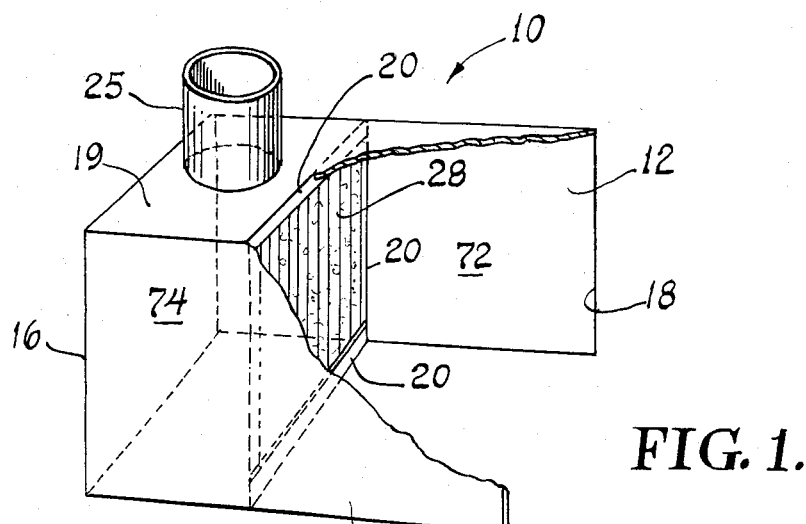
FIG. 1 is a schematic, perspective view, partially cutaway, of a paint spray booth capable of utilizing a paint spray filter incorporating the invention.
Figure 4:
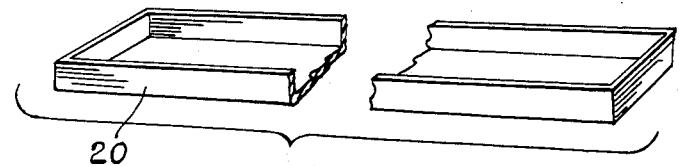

As explained above, this invention contemplates providing an improved paint spray filter for use in a paint spray booth. An exemplary embodiment of such paint spray booth is shown in FIG. 1, and is identified by reference numeral 10. Paint spray booth 10 includes a pair of side panels 12, 14 an end panel 16, and means defining an access 18 to booth 10 from the front thereof. Intermediate end panel 16 and access 18 are frame members 20. Frame members 20 typically define one or more rectangular frameworks having dimensions of approximately 36 inches high and varying widths, for example, 24 inches wide. Thus, depending on the size of booth 10, one or more frameworks comprising frame members 20 will be utilized. For example, if booth 10 is only about three feet high by two feet wide, only one framework 20 will be needed; on the other hand, if booth 10 is to be six feet high by four feet wide, two frameworks (two columns three feet high by four feet wide) will be needed. Frame members 20 can take any desirable shape, one preferred shape being the troughlike configuration shown in FIG. 4.

The frame members 20 used in the construction of booth 10 are used to support a paint spray filter, such as an original filter 28 shown in FIG. 1. Original filter 28 may take the form of an Andreae filter of the type disclosed in U.S. Pat. Nos. 3,075,337 and 4,008,060, or any other suitable prior art filter. Alternatively, the original filter 28 may be removed and replaced by the improved paint filter 30 shown in FIGS. 2 and 3. As a further alternative, improved paint spray filter 30 may be installed in booth 10 as the original filter 28.

Still referring to FIG. 1, paint spray booth 10 is shown to be divided by original filter 28 into a spraying area 72 and an exhaust area 74. An article to be sprayed (not shown) is typically placed in spraying area 72 where it is spray painted by an operator in accordance with usual spray painting operations. Fumes and particulate matter associated with the spraying process are ordinarily exhausted by ventilation means 26 communicating with the top 19 of booth 10 to pull the polluted air away from the operator of the paint spray apparatus in a well known manner.

Figures 2, 3:
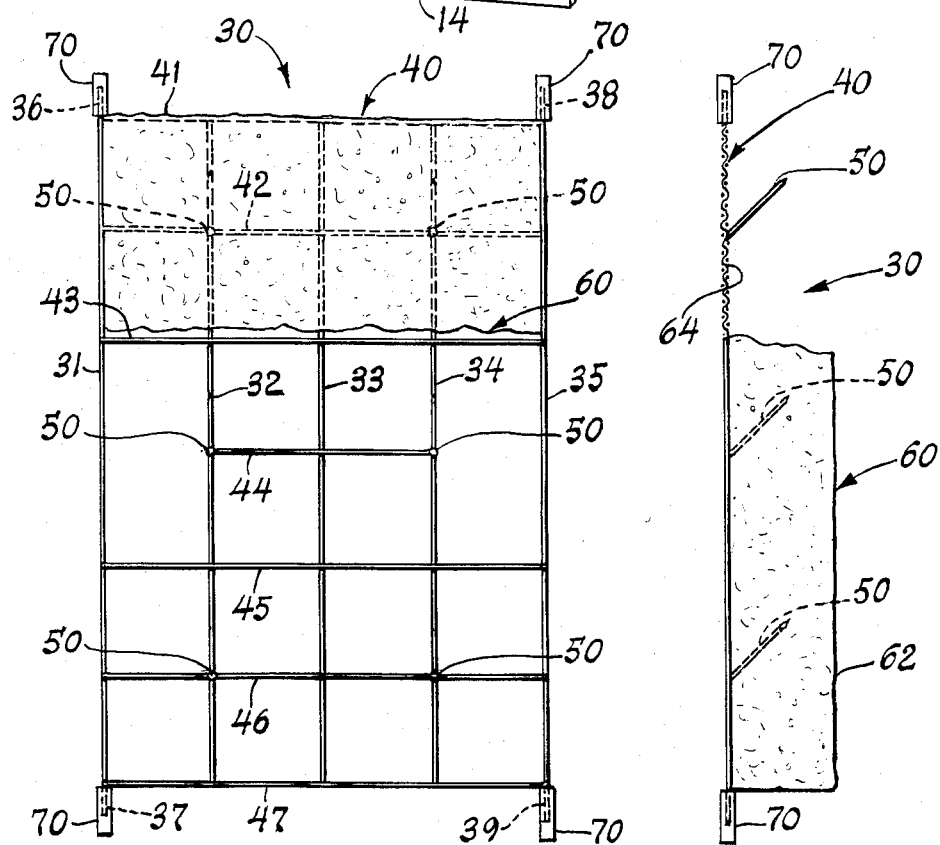
FIG. 2 is a schematic front view, partially cutaway, of a paint spray filter incorporating the invention.
FIG. 3 is a schematic side view, partially cutaway, of the paint spray filter shown in FIG. 2; and, FIG. 4 is a portion of the frame member, taken in perspective, used in conjunction with the paint spray booth shown in FIG. 1.

Reference is now made to FIGS. 2 and 3 which illustrate the paint spray filter 30 used in this preferred embodiment. Paint spray filter 30 preferably comprises a wire grid 40 having a plurality of horizontal numbers 41 through 47 and a plurality of vertical members 31 through 35. Horizontal members 41 and 47 define the horizontal edges of grid 40 and vertical members 31 and 35 define the vertical edges of grid 40. Thus, horizontal members 41 and 47 and vertical members 31 and 35 define the perimeter of the grid which extends substantially 36 inches in the vertical direction and 24 inches in the horizontal direction. Vertical members 32 and 34 are preferably located substantially 12 inches apart and substantially 6 inches from respective ones of vertical members 31 and 35, while vertical member 33 extends substantially through the center of grid 40 so that there is approximately 6 inches from respective ones of vertical members 32 and 34 and vertical member 33.

Similarly, horizontal members 42 and 46 are preferably 18 inches apart and are approximately 6 inches from respective ones of horizontal members 41 and 47. Horizontal members 43 and 45 are approximately 12 inches apart and are located approximately 6 inches from respective ones of horizontal members 42 and 46. While each of horizontal members 41, 42, 43, 45, 46 and 47 extend substantially across the entire width of grid 40, horizontal member 44, which is located approximately midway between horizontal members 43 and 45, preferably extends a distance of only approximately 12 inches—from vertical member 32 to vertical member 34.

Grid 40 further includes a plurality of attachment spikes 50. In this preferred embodiment six attachments spikes 50 are utilized. The six attachment spikes 50 are located, respectively, at the intersections of horizontal member 42 and vertical member 32 horizontal member 42 and vertical member 34, horizontal member 44 and vertical member 32, horizontal member 44 and vertical member 34, horizontal member 46 and vertical member 32, and horizontal member 46 and vertical member 34. Further, as shown in FIG. 3, spikes 50 extend upwardly and outwardly from the plane of grid 40, preferably at a 45 degree angle.

Spikes 50 serve as attachment means for holding a sheet of filter material 60 onto grid 40. As shown in FIG. 3, the sheet of filter material 60 is characterized by a front face 62 and a back face 64, and is generally coextensive with the portion of grid 40 defined by horizontal members 41 and 47 and vertical members 31 and 35. The sheet of filter material 60 is attached to grid 40 by pushing rear face 64 onto spikes 50 until rear face 64 is substantially flush against grid 40, particularly horizontal members 41 through 47 and vertical members 31 through 35. In this manner, rear face 64 of the sheet of filter material 60 substantially covers grid 40 while front face 62 of the sheet of filter material 60 is fully exposed. Though the sheet of filter material 60 can be fabricated from any suitable medium consistent with the functions thereof, monofilaments spun fiberglass has been found to be a preferred filter medium.

In this preferred embodiment vertical member 31 of grid 40 includes relatively short extensions 36, 37 at each end thereof. Similarly, vertical member 35 of grid 40 includes short extension 38, 39 at each end thereof. Secured to each of extensions 36, 37, 38 and 39 is a fitting 70 preferably made from rubber or other elastic material. Rubber fittings 70 are adapted to fit into the trough defined by frame members 20 which are secured within paint spray booth 10 as shown in FIG. 1. Paint spray filter 30 can be easily mounted in paint spray booth 10 by locating rubber fitting 70 in the trough portions of appropriate frame members 20. Indeed, due to the elastomeric composition of fitting 70, a secure friction fit against frame members 20 can be achieved.

In view of the foregoing, the method for converting a paint spray booth 10 having an original paint spray filter 28 can now be explained. In particular, the original filter 28 is removed and a substitute filter of the type shown in FIGS. 2 and 3 is provided. Thus, the substitute filter comprises a grid having a plurality of parallel vertical members including a first pair of vertical members defining the vertical edges of the grid and a second pair of vertical members located inside the edges defined by the first pair of vertical members. The grid also includes a plurality of parallel horizontal members having a first pair of horizontal members defining the horizontal edges of the grid and a second pair of horizontal members being located inside the edges defined by the first pair of horizontal members. The grid further includes attachment spikes secured to the grid extending outwardly and upwardly therefrom. A sheet of fiberglass filter material having a first face substantially covering the grid and a fully exposed second face is secured to the grid by the attachment spikes. Support means extend from the corners of the grid and are adapted to cooperate the frame members of the paint spray booth for maintaining the paint spray filter in the booth. The substitute filter so provided is then secured to the frame members.

What has been described is an improved paint spray filter and a method for substituting such a filter for an original filter in a conventional paint spray booth. The improved filters of the type described are easily disposable, and may result in savings of as much as 50% percent of the cost of the filter material. Because the margins of the filter material are free from attachment means filters of the type described can be juxtaposed with their edges overlapping, thereby providing an efficient and beneficial filtering function even when multiple filters are required. Efficiency as well as versatility is also maximized because users have the option of removing and discarding the filter medium when it becomes saturated with paint, rather than making more cumbersome changes to the paint spray booth itself, or to the support means for the filter medium. Moreover, monofilament spun fibreglas tends to diffuse, or spread out paint trapped by the filter in a better and more efficient manner than other prior art filter media, thereby requiring, under certain circumstances, less frequent filter changes.

Though the exemplary embodiment herein disclosed is preferred, numerous variations, modifications and alterations which do not part from the true scope of the invention will become apparent to persons skilled in the art. Accordingly, all such variations, modifications and alterations are intended to be covered by the appended claims.

I claim:

1. A paint spray filter for use in a paint spray booth characterized by a pair of substantially parallel side panels, an end panel interconnecting said side panels, a top panel overlying said side panels and said end panel, means defining access to said booth from the front of said booth, and frame means disposed intermediate said end panel and said access, comprising:

a grid comprising a plurality of parallel vertical members including a first pair of said vertical members defining the vertical edges of said grid and being substantially twenty-four inches apart, and a second pair of said vertical members being located substantially twelve inches apart and substantially six inches from respective ones of said first pair of said vertical members; a plurality of parallel horizontal members including a first pair of said horizontal members defining the horizontal edges of said grid, and being substantially thirty-six inches apart, and a second pair of said horizontal members being located substantially eighteen inches apart and substantially six inches from respective ones of said first pair of said vertical members, and another one of said horizontal members located substantially midway between said second pair of said horizontal members;

a plurality of attachment spikes secured to said grid, extending outwardly and upwardly therefrom, four of said spikes being located at the intersections of said second pair of said vertical members and said second pair of horizontal members, and two of said spikes being located at the intersections of said second pair of said vertical members and said other one of said horizontal members;

a sheet of fiberglass filter material having a first face substantially covering said grid and being secured thereto by said attachment spikes, and a fully exposed second face; and support means extending from the corners of said grid and adapted to cooperate with said frame means of said booth for maintaining said paint spray filter in said booth, whereby said paint spray filter defines a barrier separating said booth into an exhaust area located between said barrier and said end panel, and a spraying area located between said barrier and said access.

2. The paint spray filter defined in claim 1 wherein said supports are rubber fittings adapted to be frictionally maintained against said frame means in said booth.

* * * * *